(12) United States Patent
Noguchi

(10) Patent No.: US 7,176,965 B1
(45) Date of Patent: Feb. 13, 2007

(54) METHOD OF ADJUSTING THE BRIGHTNESS OF AN IMAGE, DIGITAL CAMERA AND IMAGE PROCESSOR USING THE METHOD

(75) Inventor: Takafumi Noguchi, Kanagawa-ken (JP)

(73) Assignee: Fuji Photo Film Co., Ltd., Minamiashigara (JP)

( * ) Notice: Subject to any disclaimer, the term of this patent is extended or adjusted under 35 U.S.C. 154(b) by 0 days.

(21) Appl. No.: 09/134,478

(22) Filed: Aug. 14, 1998

(30) Foreign Application Priority Data

Aug. 14, 1997 (JP) .................... 9-219480

(51) Int. Cl.
 *H04N 5/228* (2006.01)
 *H04N 5/238* (2006.01)
(52) U.S. Cl. .................. 348/222.1; 348/364
(58) Field of Classification Search ........... 348/221, 348/223, 229, 362, 230, 363, 364, 234; 382/168, 382/172, 169
See application file for complete search history.

(56) References Cited

U.S. PATENT DOCUMENTS

| | | | | |
|---|---|---|---|---|
| 4,450,482 A | * | 5/1984 | Ackermann | 348/672 |
| 4,943,850 A | * | 7/1990 | Asaida | 348/262 |
| 5,335,075 A | * | 8/1994 | Komiya et al. | 348/364 |
| 5,504,524 A | * | 4/1996 | Lu et al. | 348/223.1 |
| 5,861,926 A | * | 1/1999 | Kwon | 348/234 |
| 6,018,588 A | * | 1/2000 | Kim | 382/168 |
| 6,061,091 A | * | 5/2000 | Van de Poel et al. | 348/241 |
| 6,080,104 A | * | 6/2000 | Ozawa et al. | 600/180 |
| 6,111,980 A | * | 8/2000 | Sano et al. | 348/234 |
| 6,157,744 A | * | 12/2000 | Nagasaka et al. | 382/236 |
| 6,256,419 B1 | * | 7/2001 | Nagasaka et al. | 382/236 |
| 6,583,820 B1 | * | 6/2003 | Hung | 348/362 |

\* cited by examiner

*Primary Examiner*—Vivek Srivastava
*Assistant Examiner*—Timothy J. Henn
(74) *Attorney, Agent, or Firm*—Birch, Stewart, Kolasch & Birch, LLP

(57) ABSTRACT

The brightness of image data is previously defined based on the R, G, and B values of each pixel. In an image considered to have been exposed appropriately by a conventional method, when the brightness histogram for the defined image is computed, pixels having the maximum value in the definition of brightness always occupy a predetermined rate (1% or so) of all pixels. Based on this rule of thumb, the gain of an image acquisition device or the pixel value of acquired data is adjusted so that a brightness histogram (3) for image data which is an object of adjustment becomes a histogram (4) having the same characteristic as the above-mentioned appropriately exposed image.

20 Claims, 3 Drawing Sheets

METHOD OF ADJUSTING THE BRIGHTNESS OF AN IMAGE, DIGITAL CAMERA AND IMAGE PROCESSOR USING THE METHOD

FIELD OF THE INVENTION

The present invention relates to a method of adjusting the brightness of an image read from film or image photographed with a digital camera in reproducing the image as a photoprint and also relates to a digital camera and an image processor using the brightness adjustment method.

DESCRIPTION OF THE RELATED ART

Conventionally, as a method for adjusting the brightness of an image photographed with a camera, etc., auto exposure control is known. There is a widely used method which assumes the mean brightness of a photographed screen to be reflectance 18% and controls the diaphragm or shutter speed of a camera so that the mean luminance (monochrome brightness) value of a photographed screen becomes an exposure value equivalent to reflectance 18%.

To obtain higher exposure accuracy, a final mean luminance has also been computed by segmenting the entire photographed screen into a plurality of regions and then taking a mean value for each region or a difference between regions into consideration (e.g., central emphasis photometry, evaluation photometry, etc.). Particularly, some high grade single-lens reflex cameras detect a principal subject by interlocking the automatic focusing mechanism, thereby enhancing exposure accuracy.

At a printer in a laboratory as well as at a camera side, an adjustment to brightness has also been made by controlling the number of exposure seconds in exposing recording paper so that the large area transmittance density (LATD) of a negative becomes a print density of 0.75 equivalent to reflectance 18%.

However, in the above-mentioned conventional methods, when an image whose contrast is relatively low, such as a photograph taken at cloudy weather, is reproduced, the print density tends to concentrate near 0.75, so that there is a problem that the reproduced image will look dark visually. Also, in methods such as central emphasis photometry, in the case where a subject is not present at a central portion when 2 persons are photographed, there is a problem that an appropriate adjustment will not be made, so that the contents of an image are often influenced by a success of adjustment.

That is, the aforementioned conventional methods process an image so that it has appropriate brightness, on the assumption that a photographed screen meets standard conditions such as a condition that contrast is standard, a condition that a principal subject is located at a center, and the like. For this reason, in the case where such standard conditions are not met, there is a problem that an appropriate adjustment will not be always made.

SUMMARY OF THE INVENTION

The present invention has been made in view of the aforementioned problems.

Accordingly, it is an object of the present invention to provide a method of adjusting the brightness of an image so that the image with appropriate brightness is always obtained without being considerably influenced by the contents of the image.

Another object of the invention is to provide a digital camera and an image processor which is installed in a laboratory, equipped with such a brightness adjustment function.

The brightness adjustment method according to the present invention is based on the following human visual characteristic known as rule of thumb. Generally, the pixel value of each pixel of a color image is often expressed by three components: red (R), green (G), and blue (B) components. Here, the brightness of each pixel is previously defined based on the R, G, and B values. If the brightness histogram for the defined image is computed, it is known that, in an image considered to have been exposed appropriately by a conventional method, pixels having the maximum value in the definition of brightness always occupy a predetermined rate (1% or so) of all pixels. In other words, in an appropriately exposed image, clipping always occurs at the maximum value of the brightness.

It is also known that, in an image such that the density of a principal subject is approximately constant, if the principal subject is not processed but at the highlighted portion a value greater than a predetermined value is clipped, the brightness impression will increase as a whole. That is, based on the rule of thumb according to these, it may safely be said that the impression regarding the brightness of an image is determined by the frequency of a highlighted portion rather than by the mean value of the entire image.

Therefore, in accordance with the above-mentioned rule of thumb, the brightness adjustment method of the present invention adjusts brightness, not based on a mean value but based on the number (frequency) of pixels having the maximum brightness. More specifically, the brightness adjustment method of the present invention is characterized in that:

in image data which is acquired by an image acquisition device and in which a pixel value of each pixel is expressed as a set of three mutually independent components and also in which the brightness of each pixel is defined based on the three components, a rate of pixels having the maximum brightness in the definition to all pixels is made a predetermined rate by making an adjustment to the image acquisition device and/or the pixel value.

Here, the "image acquisition device" is meant to include every possible means for acquiring digital image data or for digitizing and acquiring an image, such as a scanner, a digital camera, a media drive for reading an image recorded on a media storage, communication means for transmitting image data through networks, etc.

The "set of three mutually independent components" means a three-color colorimetric system which is generally used in expressing a color image, such as a RGB colorimetric system or a CMY calorimetric system, i.e., a colorimetric system in which three components become a color visually recognized to be gray when the values of the three components are consistent with each other.

As the method of defining brightness based on the three components, specifically there is a method which takes a mean value of R, G, and B values to be brightness, a method of defining brightness on the basis of luminance, and a method which takes the maximum value among R, G, and B values to be brightness. Although the method which takes the maximum value to be brightness has the best effect among the three methods, the definition of brightness in the present invention is not limited to these examples.

The feature of the present invention resides in that the rate of pixels having the maximum brightness in the aforementioned definition to all pixels is made a predetermined ratio. As a method for obtaining this end, a method of adjusting the gain of an image acquisition device so that acquired data always becomes image data meeting the above-mentioned condition and a method of performing a transformation process on image data after acquisition so that the image data becomes image data meeting the above-mentioned condition are considered.

As a specific example of the gain adjustment method, there is a method of adjusting an exposure value at the time of photographing in the case where an image acquisition device is a digital camera, for example. In this case, if the same scene is rephotographed with the exposure value after adjustment, a photographed image with appropriate brightness can be acquired.

A digital camera of the present invention is a camera with the above-mentioned function and comprises:

image pick-up means for photographing an image and acquiring image data in which a pixel value of each pixel is expressed as a set of three mutually independent components;

brightness analyzing means for computing a histogram of the brightness of the pixel defined based on the three components for the image data acquired by the image pick-up means; and exposure control means for making an adjustment to an exposure value at the time of photographing on the basis of the histogram so that a rate of pixels having the maximum brightness in the definition to all pixels becomes a predetermined rate.

Specifically, the "computing a histogram of the brightness" means that a brightness histogram is made by performing arithmetic in accordance with a definition equation for brightness by the use of the R, G, and B values of each pixel and then totaling computed brightness for each value.

The adjustment to the exposure value is made by controlling the diaphragm or shutter of a camera. This can be done by the same method as the aforementioned conventional auto exposure.

The data transformation to the image data after acquisition is performed, for example, when a photoprint is made in an image reproducing system installed in a laboratory. But as in digital cameras, in the case where data processing is possible at a camera side, the data transformation process may be performed at a camera side. It is also possible to perform the data transformation process by a personal computer, etc.

Specifically, an image processor according to the present invention is the above-mentioned image reproducing system in a laboratory, a personal computer, etc. The image processor comprises:

data acquisition means for acquiring an image as digital data in which a pixel value of each pixel is expressed as a set of three mutually independent components;

brightness analyzing means for computing a histogram of the brightness of the pixel defined based on the three components for the digital data acquired by the data acquisition means; and data transformation means for performing a data transformation process on the acquired digital data on the basis of the histogram so that a rate of pixels having the maximum brightness in the definition to all pixels is made a predetermined rate.

In the above-mentioned brightness adjustment method, digital camera, and image processor of the present invention, the following processes are performed in order to cause the rate of pixels having the maximum brightness to all pixels to be a predetermined rate. For example, in the case where the pixel value is a value expressed in terms of a linear scale or power scale, the exposure value of a camera is adjusted, or a data transformation is performed, based on the following Eq. (1):

$$\begin{pmatrix} R' \\ G' \\ B' \end{pmatrix} = k \begin{pmatrix} R \\ G \\ B \end{pmatrix} \quad (1)$$

where R', G', and B' are the three components after a transformation; R, G, and B are the three components before a transformation; and k is a constant determined according to the aforementioned rate.

Also, in the case where the pixel value is a value expressed in terms of a logarithmic scale, the exposure value of a camera is adjusted, or a data transformation is performed, based on the following Eq. (2):

$$\begin{pmatrix} R' \\ G' \\ B' \end{pmatrix} = \begin{pmatrix} R \\ G \\ B \end{pmatrix} + \begin{pmatrix} k \\ k \\ k \end{pmatrix} \quad (2)$$

where R', G', and B' are the three components after a transformation; R, G, and B are the three components before a transformation; and k is a constant determined according to the aforementioned rate.

While the two above-mentioned equations adjust a histogram over the entire range, a method which does not change a dark portion but adjusts only a portion with high brightness is also considered. But the present invention is not limited to these brightness adjustment methods.

As previously described, the brightness adjustment method of the present invention judges whether or not the brightness of an image is appropriate by a brightness histogram, based on the rule of thumb that when a brightness histogram is computed for an image exposed appropriately by a conventional method, the rate of pixels having the maximum brightness occupies a predetermined rate. And the brightness adjustment method adjusts the gain of an image acquisition device or the pixel value of image data so that this histogram meets the above-mentioned condition.

In other words, the brightness adjustment method of the present invention is not based on the assumption that a photographed image meets some condition, as in the conventional method, but it is based on a condition necessary for an image with appropriate brightness. And since the present invention processes an image so that it meets the necessary condition, good results are always obtained regardless of the image contents.

This method is applicable even when an image is acquired and also even after acquisition.

That is, as in a digital camera of the present invention, if the camera main body is equipped with brightness analyzing means for computing a histogram of the brightness of an image and exposure control means for making an adjustment to an exposure value on the basis of the histogram so that a photographed image meets the above-mentioned condition, an image of appropriate brightness can be obtained at all times.

Also, even in the case where the method according to the present invention cannot be applied when an image is acquired, if as in the image processor of the present invention a device, equipped with brightness analyzing means for computing a histogram of the brightness of an acquired image and data transformation means for performing a data transformation process on the basis of the histogram so that the image meets the aforementioned condition, is installed in a laboratory for reproducing an image, the reproduced image can have appropriate brightness.

BRIEF DESCRIPTION OF THE DRAWINGS

The present invention will be described in further detail with reference to the accompanying drawings wherein.

DETAILED DESCRIPTION OF THE PREFERRED EMBODIMENTS

Figure 1:
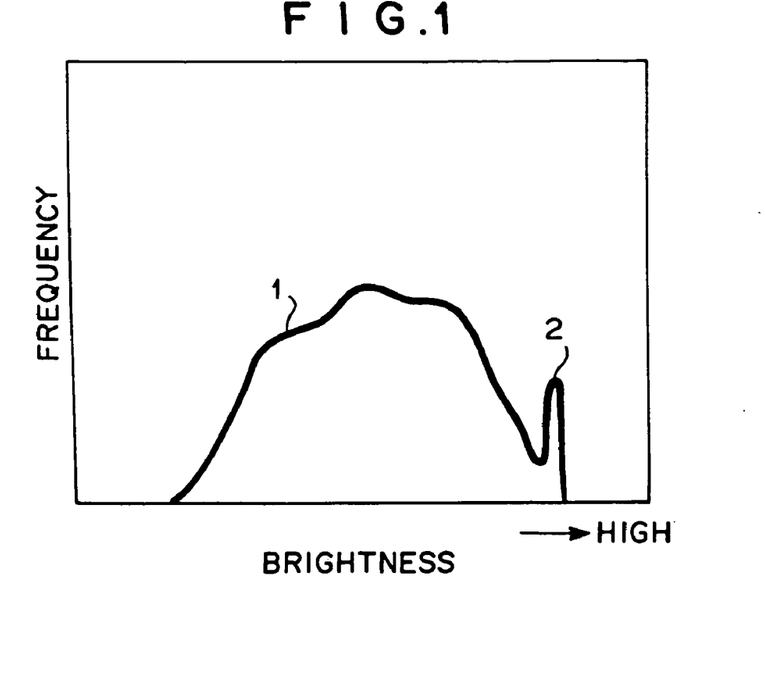
FIG. 1 is a diagram showing the brightness histogram of an image appropriately exposed by a conventional method.

A preferred embodiment of the present invention will hereinafter be described in detail in reference to the drawings. Initially, a description will be made of the human visual characteristic regarding brightness. FIG. 1 shows a brightness histogram example of negative film appropriately exposed by a conventional method. As shown in the figure, it is known that, in an appropriately exposed image, clipping 2 (1% or so) always occurs at the maximum brightness of brightness histogram 1.

It is also known that, if the dark portion (whose density is high) of an exposed image is not processed but only the bright portion is adjusted, then the impression of brightness received from the entire image will vary.

Particularly in a brightness histogram, if for an image in which the frequency of a pixel becomes gradually lower as brightness becomes higher, a value equal to or greater than a predetermined value is clipped at the predetermined value (the toe of the highlighted portion is cut), the impression of brightness will increase visually.

In other words, it is considered that the human impression of brightness obtained from an image is determined by the frequency of a highlighted portion rather than by an overall mean value. Therefore, the present invention processes an image, not based on the idea of a mean value in a conventional method but based on the idea that the frequency of the maximum brightness in a brightness histogram is managed.

Figure 2:
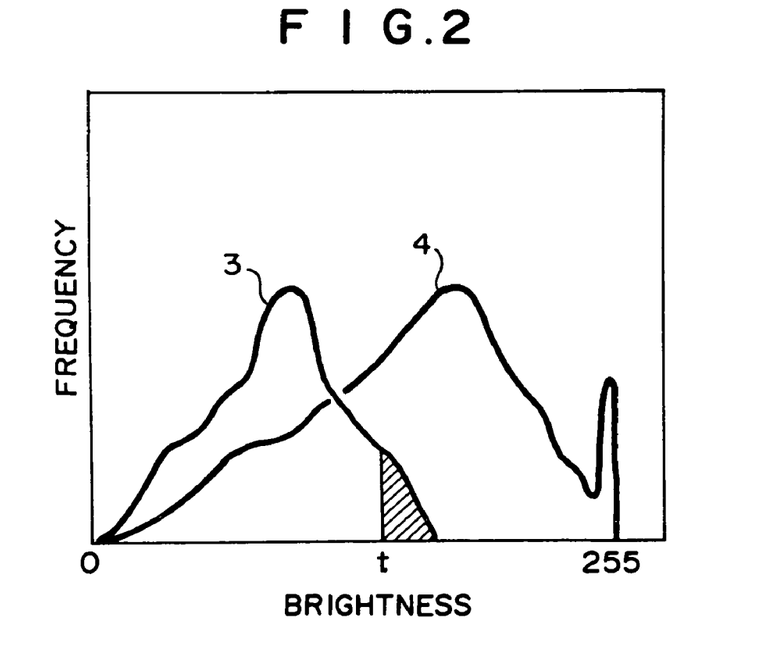
FIG. 2 is a diagram showing an embodiment of a brightness adjustment method according to the present invention.

FIG. 2 shows as an embodiment of a method of the present invention an example of a case of adjusting brightness so that image data, read by a film scanner or the like, looks brighter. The brightness histogram 3 in FIG. 2 is a histogram before an adjustment is made, while the brightness histogram 4 is a histogram after an adjustment has been made.

Here, a description will be made of a method of adjusting brightness. First, a description will be made of the definition of brightness. In this embodiment, each pixel value of an image is expressed as a combination of three components: red (R), green (G), and blue (B) components. Based on these three components, the brightness L of each pixel is defined like the following Eq. (3):

$$L = \max(R, G, B) \quad (3)$$

where L is the brightness of a pixel; R, G, and B are the red, green; and blue components, and max(x, Y, z) is the maximum value among x, y, and z.

Note that the definition of brightness in the brightness adjustment method according to the present invention is not necessarily limited to the above-mentioned Eq. (3). For example, the brightness L may be defined like the following Eq. (4):

$$L = \text{median}(R, G, B) \quad (4)$$

where L is the brightness of a pixel; R, G, and B are the red, green, and blue components; and median(x, y, z) is a median among x, y, and z.

The brightness L may also be defined like the following Eq. (5):

$$L = 0.3R + 0.6G + 0.1B \quad (5)$$

In addition, the brightness L can be defined in various manners.

Assuming each of the R, G, and B values for each pixel is expressed as 8-bit data, the brightness that is obtained based on the above-mentioned Eq. (3) can also be expressed as 8-bit data. In this case the value which the brightness can assume is a value between 0 and 255 (corresponding to the horizontal axis of the histogram in FIG. 2).

In this embodiment, the histogram 3 is adjusted so that 1% clipping occurs at the maximum brightness (255), as in the histogram 4. For this reason, the following arithmetic is performed.

In FIG. 2, brightness t is a value such that the area of the shaded portion of the histogram 3 is 1% of the entire area of the histogram 3. In other words, assuming the histogram 3 is H(x), the following Eq. (6) is established.

$$\int_t^{255} H(x)dx = 0.01 \quad (6)$$

Therefore, if the clipping rate at the maximum brightness is determined, a specific value of t can be computed from the above-mentioned Eq. 6.

For example, in the case where R, G, and B components and brightness L are expressed in terms of a linear scale or exponential scale, if computed brightness t is substituted into the following Eq. (1), the brightness histogram 3 is transformed to the brightness histogram 4.

$$\begin{pmatrix} R' \\ G' \\ B' \end{pmatrix} = k \begin{pmatrix} R \\ G \\ B \end{pmatrix} \quad (1)$$

where R', G', and B' are the red, green, and blue components after a transformation; R, G, and B are the red, green, and blue components before a transformation; and k is a constant determined according to the aforementioned rate.

Similarly, in the case where R, G, and B components and brightness L are expressed in terms of a logarithmic scale, if computed brightness t is substituted into the following Eq. (2), 1% clipping can be made to occur at the maximum brightness.

$$\begin{pmatrix} R' \\ G' \\ B' \end{pmatrix} = \begin{pmatrix} R \\ G \\ B \end{pmatrix} + \begin{pmatrix} k \\ k \\ k \end{pmatrix} \quad (2)$$

where R', G', and B' are the red, green, and blue components after a transformation; R, G, and B are the red, green, and blue components before a transformation; and k is a constant determined according to the aforementioned rate. Assuming the histogram 4 after adjustment is H'(x), H'(255)=0.01 is established.

Figure 3:
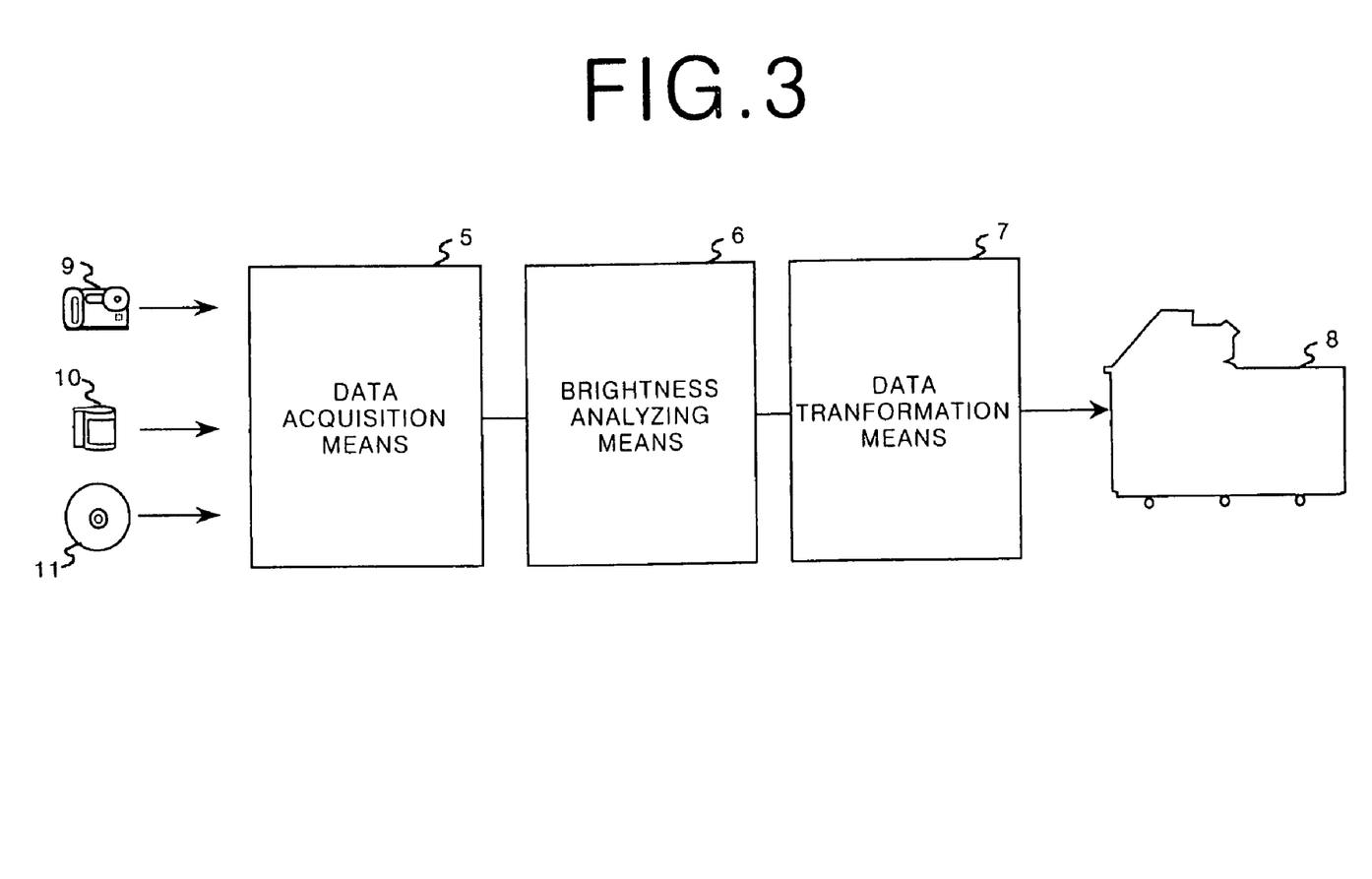
FIG. 3 is a block diagram showing an embodiment of an image processor according to the present invention.

The aforementioned process can be implemented by an image processor with constitution shown in FIG. 3. In the embodiment shown in FIG. 3, although an image processor according to the present invention is carried out as a photofinishing system which is installed in a laboratory, etc., the present invention may be carried out by incorporating software which executes the above-mentioned process into a general-purpose personal computer.

The image processor of FIG. 3 has data acquisition means 5 for acquiring digital data which represents an image, brightness analyzing means 6 for making the above-mentioned histogram, and data transformation means 7 for generating image data which has a histogram such as the brightness histogram 4 by performing arithmetic such as the above-mentioned. Furthermore, in this embodiment the image data transformed by data transformation means 7 can be output as a photoprint by a photographic printer 8. Specifically, the data acquisition means 5 is a connecting interface with a digital camera 9, or a card reader for reading a digital camera memory; a film scanner for reading developed film 10; a media drive for reading media 11 such as CD-R; communication means (not shown) for receiving image data from networks; etc.

While a description has been made in the case of adjusting brightness by transforming image data, the method according to the present invention can also be incorporated as a single function of an image data acquisition device such as a digital camera, a film scanner, etc.

For example, since the quantum level of a digital camera is proportional to (the luminance E of a subject)$^{1/2.2}$, if the diaphragm or shutter speed is adjusted to control the exposure, each pixel value of image data obtained by photographing can be adjusted.

Figure 4:
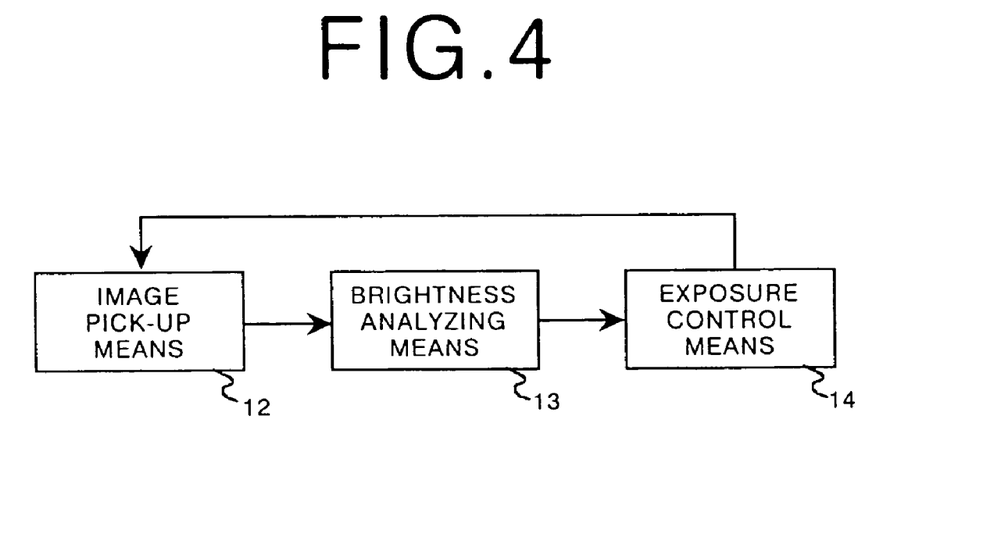
FIG. 4 is a block diagram showing an embodiment of a digital camera according to the present invention.

FIG. 4 shows the constitution of a digital camera according to the present invention. This digital camera is constituted by image pick-up means 12 such as a lens or a charge-coupled device (CCD), brightness analyzing means 13 for making the above-mentioned brightness histogram for an image obtained by photographing, and exposure control means 14 for making an adjustment to the diaphragm or shutter speed on the basis of the made brightness histogram.

According to such a digital camera, for example, even when a photographed image were overexposed and therefore in the brightness histogram the rate of pixels having the maximum brightness (255) were of the order of 5%, exposure control can be performed so that the gain is reduced from 5% to 1%. If photographing is again performed with a reset exposure value, image data such that the rate of pixels having the maximum brightness is 1%, i.e., image data with appropriate brightness, can be acquired.

As previously described, the present invention judges whether or not the brightness of an image is appropriate by the brightness histogram and adjusts this brightness histogram so that it meets the above-mentioned condition. Therefore, an object of adjustment may be either the gain of an image acquisition device or the pixel value of image data. Furthermore, it is also possible to make a fine brightness adjustment by a combination of the brightness adjustment function in the above-mentioned digital camera and the brightness adjustment function in the above-mentioned image processor.

While the present invention has been described with reference to preferred embodiments thereof, the invention is not to be limited to the details given herein, but may be modified within the scope of the appended claims.

What is claimed is:

1. A method of adjusting the brightness of an image, the method comprising the steps of:
    acquiring image data by an image acquisition device;
    expressing a pixel value of each pixel in said image data as a set of three mutually independent components;
    defining the brightness of each pixel based on said three components and;
    making an adjustment to said image so that a rate (ratio) of pixels having a maximum brightness is equal to a predetermined rate (ratio),
    wherein the predetermined rate (ratio) is predetermined prior to acquiring the image data by said acquiring image data step.

2. A method of adjusting the brightness of an image, the method comprising the steps of:
    acquiring image data by an image acquisition device;
    expressing a pixel value of each pixel in said image data as a set of three mutually independent components;
    defining the brightness of each pixel based on said three components and;
    making an adjustment to said image so that a rate (ratio) of pixels having a maximum brightness is equal to a predetermined rate (ratio),
    wherein said image acquisition device is a digital camera and the adjustment to said image is a pre-photography adjustment to an exposure value using previously acquired image data.

3. A method of adjusting the brightness of an image, the method comprising the steps of:
    acquiring image data by an image acquisition device;
    expressing a pixel value of each pixel in said image data as a set of three mutually independent components;
    defining the brightness of each pixel based on said three components and;
    making an adjustment to said image so that a rate (ratio) of pixels having a maximum brightness is equal to a predetermined rate (ratio),
    wherein said pixel value is a value expressed in terms of a linear scale or power scale and wherein the adjustment to said image is made based on the following transformation Eq. (1):

$$\begin{pmatrix} R' \\ G' \\ B' \end{pmatrix} = k \begin{pmatrix} R \\ G \\ B \end{pmatrix} \quad (1)$$

where R', G', and B' are the three components after a transformation; R, G, and B are the three components before a transformation; and k is a constant determined according to said rate.

4. A method of adjusting the brightness of an image, the method comprising the steps of:
- acquiring image data by an image acquisition device;
- expressing a pixel value of each pixel in said image data as a set of three mutually independent components;
- defining the brightness of each pixel based on said three components and;
- making an adjustment to said image so that a rate (ratio) of pixels having a maximum brightness is equal to a predetermined rate (ratio),
- wherein said pixel value is a value expressed in terms of a logarithmic scale and the adjustment to said image is made based on the following transformation Eq. (2):

$$\begin{pmatrix} R' \\ G' \\ B' \end{pmatrix} = \begin{pmatrix} R \\ G \\ B \end{pmatrix} + \begin{pmatrix} k \\ k \\ k \end{pmatrix} \quad (2)$$

where R', G', and B' are the three components after a transformation; R, G, and B are the three components before a transformation; and k is a constant determined according to said rate.

5. A method of adjusting the brightness of an image, the method comprising the steps of:
- acquiring image data by an image acquisition device;
- expressing a pixel value of each pixel in said image data as a set of three mutually independent components;
- defining the brightness of each pixel based on said three components and;
- making an adjustment to said image so that a rate (ratio) of pixels having a maximum brightness is equal to a predetermined rate (ratio)
- wherein said image acquisition device is a data acquisition device for acquiring an image as digital data and the adjustment to said image is a data transformation process of transforming the acquired digital data,
- wherein said pixel value is a value expressed in terms of a linear scale or power scale and said data transformation process is a process based on the following transformation Eq. (1):

$$\begin{pmatrix} R' \\ G' \\ B' \end{pmatrix} = k \begin{pmatrix} R \\ G \\ B \end{pmatrix} \quad (1)$$

where R', G', and B' are the three components after a transformation; R, G, and B are the three components before a transformation; and k is a constant determined according to said rate.

6. A method of adjusting the brightness of an image, the method comprising the steps of:
- acquiring image data by an image acquisition device;
- expressing a pixel value of each pixel in said image data as a set of three mutually independent components;
- defining the brightness of each pixel based on said three components and;
- making an adjustment to said image so that a rate (ratio) of pixels having a maximum brightness is equal to a predetermined rate (ratio),
- wherein said image acquisition device is a data acquisition device for acquiring an image as digital data and the adjustment to said image is a data transformation process of transforming the acquired digital data wherein said pixel value is a value expressed in terms of a logarithmic scale and said data transformation process is a process based on the following transformation Eq. (2):

$$\begin{pmatrix} R' \\ G' \\ B' \end{pmatrix} = \begin{pmatrix} R \\ G \\ B \end{pmatrix} + \begin{pmatrix} k \\ k \\ k \end{pmatrix} \quad (2)$$

where R', G', and B' are the three components after a transformation; R, G, and B are the three components before a transformation; and k is a constant determined according to said rate.

7. The method as set forth in any one of claims 1, 2, 3, 4, 5 and 6 wherein said brightness is defined by the following Eq. (3):

$$L = \max(R, G, B) \quad (3)$$

where L is the brightness of a pixel; R, G, and B are the three components; and max(x, y, z) is the maximum value among x, y, and z.

8. A digital camera comprising:
- image pick-up means for photographing an image and acquiring image data in which a pixel value of each pixel is expressed as a set of three mutually independent components;
- brightness analyzing means for computing a histogram of the brightness of said pixel defined based on said three components for said image data acquired by said image pick-up means; and
- exposure control means for automatically making an adjustment to an exposure value at the time of photographing according to said histogram so that a rate (ratio) of pixels having a maximum brightness is equal to a predetermined rate (ratio).

9. The digital camera as set forth in claim 8, wherein said brightness is defined by the following Eq. (3):

$$L = \max(R, G, B) \quad (3)$$

where L is the brightness of a pixel; R, G, and B are the three components; and max(x, y, z) is the maximum value among x, y, and z.

10. An image processor comprising:
- data acquisition means for acquiring an image as digital data in which a pixel value of each pixel is expressed as a set of three mutually independent components;
- brightness analyzing means for computing a histogram of the brightness of said pixel defined based on said three components for said digital data acquired by said data acquisition means; and
- data transformation means for automatically performing a data transformation process on the acquired digital data according to said histogram so that a rate (ratio) of pixels having a maximum brightness is equal to a predetermined rate (ratio),
- wherein the predetermined rate (ratio) is predetermined prior to acquiring the image by said data acquisition means.

11. An image processor comprising:
- data acquisition means for acquiring an image as digital data in which a pixel value of each pixel is expressed as a set of three mutually independent components;

brightness analyzing means for computing a histogram of the brightness of said pixel defined based on said three components for said digital data acquired by said data acquisition means; and data transformation means for automatically performing a data transformation process on the acquired digital data according to said histogram so that a rate (ratio) of pixels having a maximum brightness is equal to a predetermined rate (ratio), wherein said pixel value is a value expressed in terms of a linear scale or power scale and said data transformation process is process based on the following transformation Eq. (1):

$$\begin{pmatrix} R' \\ G' \\ B' \end{pmatrix} = k \begin{pmatrix} R \\ G \\ B \end{pmatrix} \quad (1)$$

where R', G', and B' are the three components after a transformation; R, G, and B are the three components before a transformation; and k is a constant determined according to said rate.

12. An image processor comprising:

data acquisition means for acquiring an image as digital data in which a pixel value of each pixel is expressed as a set of three mutually independent components;

brightness analyzing means for computing a histogram of the brightness of said pixel defined based on said three components for said digital data acquired by said data acquisition means; and data transformation means for automatically performing a data transformation process on the acquired digital data according to said histogram so that a rate (ratio) of pixels having a maximum brightness is equal to a predetermined rate (ratio), wherein said pixel value is a value expressed in terms of a logarithmic scale and said data transformation process is a process based on the following transformation Eq. (2):

$$\begin{pmatrix} R' \\ G' \\ B' \end{pmatrix} = \begin{pmatrix} R \\ G \\ B \end{pmatrix} + \begin{pmatrix} k \\ k \\ k \end{pmatrix} \quad (2)$$

where R', G', and B' are the three components after a transformation; R, G, and B are the three components before a transformation; and k is a constant determined according to said rate.

13. The image processor as set forth in any one of claims 10 through 12, wherein said brightness is defined by the following Eq. (3):

$$L = \max(R, G, B) \quad (3)$$

where L is the brightness of a pixel; R, G, and B are the three components; and max(x, y, z) is the maximum value among x, y, and z.

14. A method of adjusting the brightness of an image, the method comprising the steps of:

acquiring image data by an image acquisition device;

expressing a pixel value of each pixel in said image data as a color value;

defining the brightness of each pixel based on said color value and;

making an adjustment to said pixel value so that a rate (ratio) of pixels having a maximum brightness is equal to a predetermined rate (ratio), wherein the predetermined rate (ratio) is predetermined prior to acquiring the image data by said acquiring image data step.

15. A digital camera comprising:

image pick-up means for photographing an image and acquiring image data in which a pixel value of each pixel is expressed as a color value;

brightness analyzing means for computing a histogram of the brightness of said pixel defined based on said color value for said image data acquired by said image pick-up means; and exposure control means for automatically making an adjustment to an exposure value at the time of photographing according to said histogram so that a rate of pixels having a maximum brightness among all pixels is equal to a predetermined rate.

16. An image processor comprising:

data acquisition means for acquiring an image as digital data in which a pixel value of each pixel is expressed as a color value;

brightness analyzing means for computing a histogram of the brightness of said pixel defined based on said color value for said digital data acquired by said data acquisition means; and data transformation means for automatically performing a data transformation process on the acquired digital data according to said histogram so that a rate of pixels having a maximum brightness among all pixels is equal to a predetermined rate, wherein the predetermined rate (ratio) is predetermined prior to acquiring the image data by said acquiring image data step.

17. The image processor as set forth in claim 16, wherein said data transformation process is a pre-exposure adjustment to an exposure value using previously acquired image data.

18. A method of adjusting the brightness of an image, the method comprising the steps of:

acquiring image data by an image acquisition device;

expressing a pixel value of each pixel in said image data as a set of three mutually independent components;

defining the brightness of each pixel based on said three components and;

making an adjustment to said image so that a rate (ratio) of pixels having a maximum brightness is equal to a predetermined rate (ratio), wherein said adjustment is a pre-exposure adjustment to an exposure value using previously acquired image data.

19. An image processor comprising:

data acquisition means for acquiring an image as digital data in which a pixel value of each pixel is expressed as a set of three mutually independent components;

brightness analyzing means for computing a histogram of the brightness of said ixel defined based on said three components for said digital data acquired by said data acquisition means; and data transformation means for automatically performing a data transformation process on the acquired digital data according to said histogram so that a rate (ratio) of pixels having a maximum brightness is equal to a predetermined rate (ratio), wherein the said data transformation process is a pre-exposure adjustment to an exposure value using previously acquired image data.

20. A method of adjusting the brightness of an image, the method comprising the steps of:

acquiring image data by an image acquisition device;

expressing a pixel value of each pixel in said image data as a color value;

defining the brightness of each pixel based on said color value and;

making an adjustment to said pixel value so that a rate (ratio) of pixels having a maximum brightness is equal to a predetermined rate (ratio), wherein said adjustment is a pre-exposure adjustment to an exposure value using previously acquired image data.

* * * * *